TRIGGER CIRCUIT EMPLOYING A TRANSISTOR HAVING A NEGATIVE RESISTANCE ELEMENT IN THE EMITTER CIRCUIT THEREOF

Filed May 20, 1963

INVENTORS
LOUIS S. COSENTINO
& CHARLES M. WINE
BY John V. Regan
Attorney

United States Patent Office 3,302,036
Patented Jan. 31, 1967

3,302,036
TRIGGER CIRCUIT EMPLOYING A TRANSISTOR HAVING A NEGATIVE RESISTANCE ELEMENT IN THE EMITTER CIRCUIT THEREOF

Louis S. Cosentino, Somerset, and Charles M. Wine, Princeton, N.J., assignors to Radio Corporation of America, a corporation of Delaware
Filed May 20, 1963, Ser. No. 281,552
6 Claims. (Cl. 307—88.5)

Figure 1:
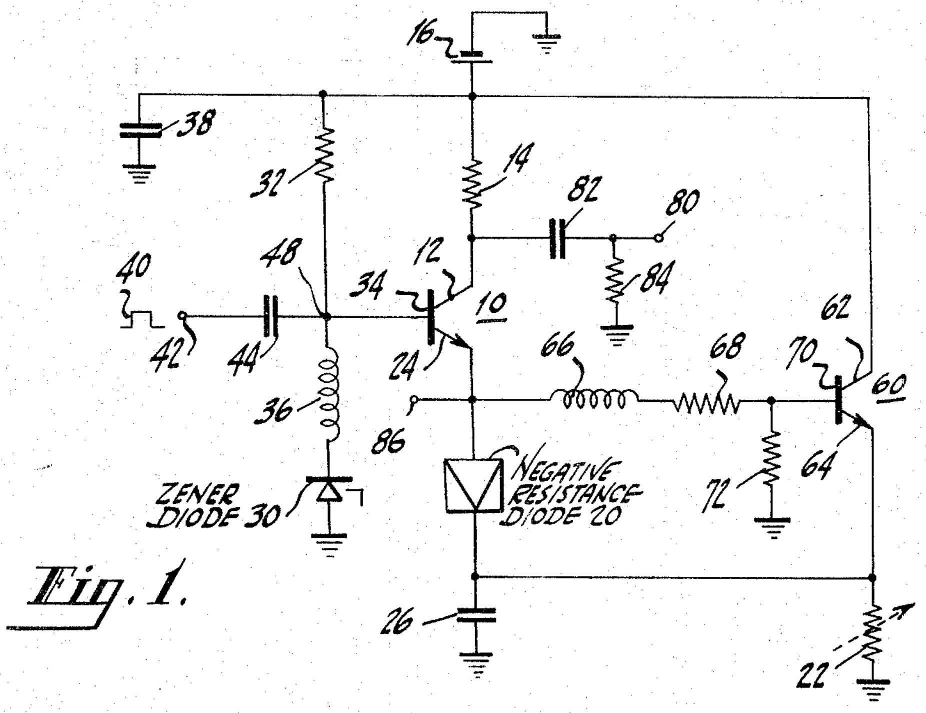

This invention relates to trigger circuits and, in particular, to an improved circuit that is especially well-suited to triggering at high speed by an input signal of very low amplitude.

A trigger circuit may be defined for present purposes as a circuit that provides a marked change in output when impulsed by an input signal having an amplitude greater than a given threshold value. The threshold may be set at a selected value by proper selection of component values and bias, for example.

Among other uses, a trigger circuit has particular utility as a sense amplifier for the high speed memory of a digital computer. The output signals of some memories, a cryogenic memory for example, are of very short duration and only a few millivolts in amplitude. Accordingly, if a trigger circuit is to have utility as a sense amplifier for such a memory, the circuit should be capable of being triggered at very high speed by signals of very low amplitude.

Prior art trigger circuits, monostable multivibrators with two transistors or tubes regeneratively coupled for example, do not produce pulses of a duration as short as desired for certain sense amplifiers. Moreover, they generally are not susceptible to triggering by low amplitude signals because the sensitivity of the threshold to changes in operating parameters and other conditions tends to cause false triggering, unless the threshold is set at a relatively high value. Also, many prior art trigger circuits have a low duty factor due to a long recovery period.

It is one object of this invention to provide an improved trigger circuit that can be triggered at high speeds.

It is another object of this invention to provide a trigger circuit that can be triggered at high speed to produce an output pulse of very short duration, several nanoseconds for example.

It is still another object of this invention to provide a trigger circuit that can be triggered at high speed by an input signal of very low amplitude, on the order of several millivolts.

A further object of this invention is to provide an improved trigger circuit having the qualities described above, and in which the circuit is relatively insensitive to fluctuations in power supply voltages and variations in other parameters.

Briefly stated, the invention comprises a negative resistance diode, which may be a tunnel diode, having a first terminal connected to the emitter of a transistor. A resistor is connected to the second terminal of the negative resistance diode and in circuit with the emitter. The transistor is biased quiescently so that the diode is operated in a low voltag estate and at a preselected current level which is determinative of the circuit's threshold. An input signal applied at the base and of greater amplitude than the threshold switches the diode to a condition of high voltage. By connecting a capacitor of suitable value between a point of reference potential and the second terminal of the diode, the voltage at the second terminal may be held constant, for practical purposes, while the diode switches from the low voltage condition to the high voltage condition. The increase in voltage across the diode causes the transistor to turn off, and a large output signal is produced at the collector. As the transistor turns off, the diode current falls to a low value. The diode then switches back to the low voltage condition, the transistor turns back on and the circuit returns to its original, quiescent operating conditions.

One important advantage of this arrangement is that the circuit may be so biased that the diode may be operated close to its switching threshold without false triggering.

Another important advantage is that an automatic unlocking control may be connected in the circuit to prevent the diode from remaining in a condition of high voltage under adverse conditions, or when the circuit is energized initially.

Figure 2:
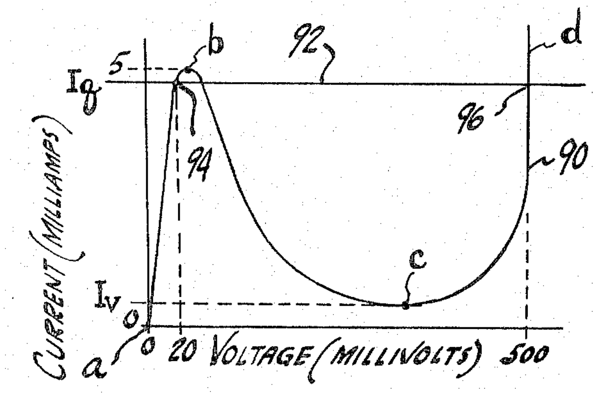

In the accompanying drawing:

FIGURE 1 is a schematic diagram of a trigger circuit according to the invention; and FIGURE 2 is a volt-ampere characteristic of one known type of negative resistance diode suitable for use in practicing the invention, which characteristic is useful in explaining the operation of the circuit.

The circuit includes a first transistor 10 of one conductivity type, illustrated as NPN type, having its collector 12 connected by a collector resistor 14 to the positive terminal of a voltage source, illustrated as a battery 16. The negative terminal of battery 16 is returned to a point of reference potential, indicated by the conventional symbol for circuit ground. A negative resistance diode 20, which may be a tunnel diode, and a resistor 22 are serially connected, in the order named, between the emitter electrode 24 and ground. A bypass capacitor 26 is connected between the cathode of diode 20 and ground.

Quiescent bias for first transistor 10 is provided by the combination of a Zener diode 30 and a resistor 32 connected, in the order, named, between circuit ground and the positive terminal of battery 16. The lower terminal of resistor 32 is connected to the base 34 of first transistor 10. As is known, a Zener diode has an operating region of constant voltage when biased in the reverse direction beyond the break-over point. The value of resistor 32 is selected to provide a desired level of current for the Zener diode 30. An inductor 36, connected in series with the bias network between Zener diode 30 and junction 48, prevents signal current from being shunted to the Zener diode in response to input signals 40 applied at input terminal 42. An additional inductor (not shown) may be connected between junction 48 and resistor 32 in the event that the value of resistor 32 must be selected so low as to present the danger of input current being shunted through resistor 32.

For reasons which will become apparent as the discussion proceeds, input signal current should not be applied at the base 34 for too long a duration, lest multiple triggering of the circuit result in response to a single input signal 40. Multiple triggering can be avoided by connecting a capacitor 44 between the input terminal 42 and the base 34 of first transistor 10. Capacitor 44 is chosen in value so that the capacitor operates in combination with the input resistance of the transistor 10 to differentiate the input signals 40.

An automatic unlocking control comprises a second transistor 60 of the same conductivity type as first transistor 10, NPN type in this case. The collector 62 is connected directly to the positive terminal of battery 16, whereby second transistor 60 is connected in a common collector configuration. Emitter 64 is connected directly to the ungrounded terminal of emitter resistor 22 and to the cathode of the negative resistance diode 20. The series combination of an inductor 66 and a current limiting resistor 68 is connected in the order named between the emitter 24 of first transistor 10 and the base 70 of second transistor 60, which base 70 is connected to ground by way of a resistor 72.

A first output of the circuit may be derived at an output terminal 80, which is coupled to the collector 12 of first transistor 10 by way of capacitor 82, and which is also connected to ground by way of a resistor 84. A second output, of different amplitude and level from the first output, may be derived at an output terminal 86 connected at the emitter 24 of first transistor 10.

A suitable negative resistance diode for the diode 20 is one having a volt-ampere operating characteristic of the general type illustrated in FIGURE 2 and identified by reference character 90. In FIGURE 2, voltage in millivolts is plotted along the abscissa and current in milliamperes is plotted along the ordinate. The particular values of voltage and current given in FIGURE 2 are for one type of tunnel diode and are intended to be exemplary only. Also, the particular characteristic 90 is for one type of tunnel diode, which is the preferred type of device for use in the circuit. The shape of the operating characteristic of other suitable type diodes may vary to some extent from that shown in the diagram. In any event, a suitable diode is one having a first positive resistance region *ab* at low voltage, a second region *cd* of positive resistance at high voltage, relatively speaking, and a region *bc* of negative resistance joining the two regions of positive resistance.

The circuit may be understood by first considering the method of operation of a tunnel diode in general when the tunnel diode is connected in a circuit and biased for bistable operation. A tunnel diode in such a circuit arrangement may have a load line 92 which intersects both positive resistance regions at substantially the same current value when the diode is connected in series with a resistor of large value compared to the resistance of the diode itself. The point 94 of intersection of load line 92 with the first positive resistance region *ab* is a point of stable operation, whereby the diode will continue to be biased at the operating point 94 so long as circuit conditions remain unchanged. However, if an input signal is applied to increase the diode current above a value corresponding to the peak *b*, the diode will switch rapidly through the negative resistance region and stabilize at the operating point 96 after the input signal terminates. It will be noted that operating point 96 corresponds to a voltage of 500 millivolts across the diode, while operating point 94 corresponds to a voltage of approximately 20 millivolts across the diode.

The increment of input current required to switch the diode from the low voltage state to the high voltage state is determined by the quiescent operating point 94. In FIGURE 2, only a small current increase is required to switch the diode. The point 94 is determined by the value of the quiescent current and this current, in turn, is determined by the operating voltage and the value of the resistance connected in series with the diode. For other values of the latter quantities, the quiescent operating point can be moved elsewhere along the positive resistance region *ab*.

Once switched, the diode remains stably biased in the second region of positive resistance *cd* as long as the current through the diode exceeds a value greater than the valley current $I_v$. If the diode current is reduced below this value, the diode switches rapidly back through the negative resistance region to a point in the first positive resistance region *ab* and, at the termination of the switching current signal, returns to the stable operating point 94.

Consider now the operation of the FIGURE 1 circuit. The Zener diode 30 and resistor 32 provide a controlled and stable quiescent operating bias between the base 34 and emitter 24 of first transistor 10. A capacitor 38 may be connected in parallel with the battery 16 to eliminate or at least reduce fluctuations in the voltage supplied by battery 16 by shunting transients around the battery. The voltage provided at the base 34 by the bias arrangement has a polarity and amplitude to bias the transistor 10 in the on, or conducting, condition, whereby current flows quiescently through tunnel diode 20. The threshold for the circuit is determined by the value of quiescent current through the diode and this value is preselected. The sum of the voltage drops across emitter resistor 22, tunnel diode 20 and the emitter 24-base 34 junction is equal to the quiescent base bias voltage. The value of emitter resistor 22 is selected to provide the desired value of quiescent current. Resistor 22 may be made variable, as indicated by the dashed arrow, so that the threshold may be varied selectively.

Let it be assumed that the quiescent current through the diode 20 has a value $I_q$, whereby the diode 20 is quiescently biased at the operating point 94 of FIGURE 2. The voltage across the tunnel diode 20 then is about 20 millivolts, whereby second transistor 60 is substantially nonconducting. A positive input pulse 40 applied at input terminal 42 increases the forward bias of transistor 10 and thereby increases the current through diode 20. Inductor 36 prevents the input current from flowing to the Zener diode 30. If the input signal 40 exceeds the threshold, the diode 20 current will exceed the peak value corresponding to point *b* on the operating characteristic 90, and the diode 20 will switch rapidly to its high voltage state, increasing the voltage across the diode 20 by about one-half volt.

Capacitor 26 is selected in value to maintain the voltage at the cathode of diode 20 substantially constant for a longer period of time than the switching time of the tunnel diode. Stated in another way, the capacitive time constant is selected to be long compared to the switching time of the diode. By "capacitive time constant" is meant the time constant of capacitor 26 and the resistance "seen" by the capacitor. Actually, the capacitor 26 is selected to maintain the voltage substantially constant for a period at least as long as the switching time of diode 20 and the turn-off time of first transistor 10, for reasons to be explained. Consequently the voltage at the emitter 24 rises by about one-half volt when the diode switches, and the base 34-emitter 24 voltage then becomes too small to maintain the transistor 10 in conduction, and the transistor 10 turns off. When transistor 10 turns off, current through the tunnel diode 20 decreases to a value below the valley current $I_v$ (FIGURE 2) and the diode 20 then switches back to the low voltage state. This reduces the emitter 24 voltage, whereby first transistor 10 turns on again and the original quiescent conditions are reestablished, provided that the input pulse is no longer present at the base 34. If the input pulse is still present, the tunnel diode 20 will again switch to the high voltage state and this cycling will continue as long as the input pulse is present at the base 34. If repeated cycling and pulsing is not desired, repeated triggering in response to wide input pulses may be prevented by connecting the capacitor 44 in the base input circuit to differentiate the input pulses.

The turn-off time of first transistor 10 is longer than the switching time of tunnel diode 20. In order to turn off first transistor 10, it is desired to have the emitter 24 voltage held high during the period of turn-off. Therefore, the voltage at the cathode of tunnel diode 20 is held substantially constant. Otherwise, the current and voltage may adjust themselves to keep the tunnel diode in the high voltage state without turning off the transistor. Proper operation is assured by selecting the capacitor 26 to have a value such that the capacitor maintains the voltage at the tunnel diode 20 cathode for a period at least as long as the switching time of the tunnel diode and the turn-off time of the transistor. That is, the RC time constant of capacitor 26 is at least as long as the switching time and turn-off time.

A large voltage change is experienced at the collector 12 when transistor 10 turns off. The magnitude of this voltage change is determined by the value of resistor 14 and the quiescent current which flows through this resistor when the transistor 10 is conducting. The voltage change at the collector 12 is coupled through capacitor 82 and appears across load resistor 84. A second output signal, of different magnitude and voltage level, appears between output terminals 86 and reference ground. The voltage at output terminal 86 changes by an amount equal approximately to the difference in voltage across the tunnel diode between the high voltage and low voltage conditions of the diode. The width or duration of the output pulses appearing at terminals 80 and 86 is determined primarily by the switching time of the tunnel diode 20 and the switching characteristics of the transistor 10, and may be of the order of several nanoseconds.

The inductor 66 in the base 70 circuit of second transistor 60 presents the current through the inductor 66 from changing instantaneously when the tunnel diode 20 switches. In fact, the value of the inductance is selected so that the inductive time constant is longer than the complete cycling time of tunnel diode 20, whereby second transistor 60 never turns on in normal circuit operation. By "inductive time constant" is meant the time constant of the inductor 66 and the resistance "seen" by this inductor. The inductive time constant may be, for example, about the same as the time constant of capacitor 26.

It is possible under adverse operating conditions, such as when power is first applied to the circuit, for the tunnel diode 20 to switch to the high voltage state and remain there, thus rendering the circuit immune to triggering and destroying circuit operation. This trigger immune condition is prevented in the FIGURE 1 circuit by the second transistor 60 and its related circuitry as follows. The voltage across tunnel diode 20 appears substantially across the emitter 64-base 70 junction of second transistor 60. If the tunnel diode 20 should remain in the high voltage state for a prolonged period, longer than the inductive time constant of inductor 66, then the approximately one-half volt across the diode 20 would appear across the emitter 64-base 70 junction. Enough current would then flow through the base circuit of transistor 60 to turn on this transistor and cause a large collector current to flow through the collector 62-emitter 64 path. This current flowing though the emitter resistor 22 increases the voltage across the resistor 22 sufficiently to turn off first transistor 10. Current through tunnel diode 20 then reduces to a value below the valley current $I_v$, and the tunnel diode 20 switches to the low voltage state. Second transistor 60 then turns off because of the reduced base drive, first transistor 10 turns back on, and the desired quiescent operating conditions are established.

Most prior art trigger circuits cannot have their thresholds set at a very low value because of the danger of false triggering due to a change in circuit operating conditions or circuit parameters. These changes generally are of the slow varying type such as a change in transistor parameter or component value due to temperature change, and fluctuations in power supplies. In the FIGURE 1 circuit, on the other hand, the arrangement is such that the quiescent current though the tunnel diode 20 may be set quite close to the peak value *b*, allowing the circuit to be triggered by a low amplitude input signal.

Zener diode 30 provides a substantially fixed bias voltage between base 34 and ground. As mentioned previously, the sum of the voltage drops across emitter resistor 22, tunnel diode 20 and emitter 24-base 34 junction equals the Zener diode 30 voltage. Resistor 22 is a precision resistor with good tolerance, one percent for example. Any slow change in quiescent current, due to a change in transistor parameter or fluctuation in power supply, for example, results in a change in voltage across emitter resistor 22. Since the voltage from first transistor base 34 to ground is fixed, a change in voltage across resistor 22 causes a corresponding change in voltage across the base 34-emitter 24 junction in the proper direction tending to restore the quiescent current to its correct value. Thus, if the quiescent emitter 24 current should increase a small amount from an initial value, the voltage across emitter resistor 22 increases, and the emitter 24-base 34 junction voltage decreases and causes the emitter current to decrease toward its initial value. In this way, the circuit is self-regulating and automatically adjusts the quiescent current substantially to the preset value.

The circuit as illustrated is sensitive only to positive going input signals. A similar circuit, sensitive to negative going signals, may be provided by using PNP type transistors and reversing the connections to the Zener diode 30, tunnel diode 20 and battery 16.

By way of example only, and not intending to be limited thereto, the components of the FIGURE 1 circuit may have the following values for an input threshold of 25 millivolts:

| | |
|---|---|
| Battery **16** ____volts | 30 |
| *Resistors* | Ohms |
| **14** | 620 |
| **22** | 4.8K |
| **32** | 1.1K |
| **68** | 100 |
| **72** | 24K |
| **84** | 50 |
| (1K ohm=1,000 ohms) | |
| *Transistors* | |
| **10** | 2N917 |
| **60** | 2N647 |
| *Inductors* | μhenries |
| **36** | 10 |
| **66** | 1000 |
| *Capacitors* | μfarads |
| **26** | 0.01 |
| **38** | 1.0 |
| **82** | 0.1 |
| Zener **30** ____volts | 24.5 |
| Diode **20** ____ma. peak germanium | 5 |

What is claimed is:

1. A high speed threshold circuit comprising:

a transistor having a base, an emitter and a collector;

a two-terminal circuit element having a volt-ampere characteristic with a first positive resistance region of low voltage, relatively speaking, a second positive resistance region of relatively high voltage, and a region of negative resistance between the two positive resistance regions;

a point of reference potential;

a resistor connected in series with said circuit element between said reference point and said emitter;

a load impedance connected at said collector;

bias means connected between said base and said reference point providing a quiescent emitter current which biases said circuit element in the first positive resistance region, said element being switchable to the second positive resistance region when the emitter current exceeds a predetermined value;

a capacitor connected in a circuit across said resistor to the exclusion of said circuit element, and having a time constant which is long compared to the switching time of said circuit element and the turnoff time of said transistor; and means for applying input signals between said base and said reference point.

2. The combination comprising:

a transistor having a base, an emitter and a collector;

output means connected to said collector;

a two-terminal negative resistance device having a volt-ampere characteristic with a first positive resistance region at low voltage, a second positive resistance region at high voltage, relatively speaking, and a region of negative resistance joining the two positive resistance regions;

a resistor connected in series with said negative resistance device in the emitter circuit of said transistor;

means for supplying an input signal to said base to shift the operation of said device from a point in the first positive resistance region to a point in the second positive resistance region; and a capacitor connected across said resistor.

3. The combination comprising:

a transistor having a base, an emitter and a collector;

a load impedance connected to said collector;

a tunnel diode and a resistor serially connected in the emitter circuit;

means for applying input signals between said base and said emitter to switch the tunnel diode; and a capacitor connected in parallel with said resistor and having a value to maintain the voltage across said resistor for a period longer than the switching time of said tunnel diode.

4. The combination comprising:

a transistor having an emitter, a base and a collector;

a load impedance connected to said collector;

input circuit means coupled to said base, a two-terminal, negative resistance device having first and second regions of positive resistance joined by a region of negative resistance;

a resistor connected in series with said device between said emitter and a point of fixed potential; and a by-pass capacitor connected across said resistor.

5. The combination comprising:

a transistor having a base, an emitter and a collector;

output means connected to said collector;

input means coupled to said base;

a tunnel diode and a resistor serially connected in the emitter circuit; and a capacitor connected across said resistor to the exclusion of said tunnel diode and having a time constant which is longer than the switching time of the tunnel diode and the turnoff time of said transistor.

6. The combination comprising:

a first transistor having a base, an emitter and a collector;

a two-terminal device having a volt-ampere characteristic with two regions of positive resistance joined by a region of negative resistance;

means for connecting a first terminal of said device to said emitter;

a resistor connected between the second terminal of said device and a point of reference potential;

output means connected at the collector;

a second transistor connected in the common collector configuration and having an emitter connected to the second terminal of said device, and a base;

an inductor connected between the first terminal of said device and the base of said second transistor;

means for supplying a signal to the base of said first transistor for switching the operating point of said device from the first to the second positive resistance region; and a capacitor connected between the second terminal of said device and said point of reference potential, said capacitor having a time constant which is longer than the switching time of said device and the turnoff time of said first transistor.

References Cited by the Examiner

UNITED STATES PATENTS 3,090,926 5/1963 Engel ............ 307—88.5

ARTHUR GAUSS, *Primary Examiner.*

S. MILLER, *Assistant Examiner.*